United States Patent
Kuhnel et al.

(10) Patent No.: US 9,307,694 B2
(45) Date of Patent: Apr. 12, 2016

(54) FAULT-TOLERANT SENSING AND MONITORING COMMUNICATIONS BUS SYSTEM FOR AGRICULTURAL APPLICATIONS

(71) Applicant: DICKEY-john Corporation, St. Paul, MN (US)

(72) Inventors: David Kuhnel, Johnstown, CO (US); Gregry C. Miller, Chatham, IL (US)

(73) Assignee: DICKEY-JOHN CORPORATION, St. Paul, MN (US)

( * ) Notice: Subject to any disclaimer, the term of this patent is extended or adjusted under 35 U.S.C. 154(b) by 0 days.

(21) Appl. No.: 14/370,550

(22) PCT Filed: Jan. 7, 2013

(86) PCT No.: PCT/US2013/020464
§ 371 (c)(1),
(2) Date: Jul. 3, 2014

(87) PCT Pub. No.: WO2013/103937
PCT Pub. Date: Jul. 11, 2013

(65) Prior Publication Data
US 2014/0343806 A1   Nov. 20, 2014

Related U.S. Application Data

(60) Provisional application No. 61/584,000, filed on Jan. 6, 2012.

(51) Int. Cl.
*A01C 21/00* (2006.01)
*G01F 1/76* (2006.01)
*G06F 11/20* (2006.01)
*G06F 11/07* (2006.01)
*H04L 12/42* (2006.01)
(Continued)

(52) U.S. Cl.
CPC .............. *A01C 21/00* (2013.01); *A01B 79/005* (2013.01); *A01C 7/105* (2013.01); *G01F 1/76* (2013.01);
(Continued)

(58) Field of Classification Search
CPC ............ G06F 11/2015; G06F 11/0736; G06F 11/079; A01C 21/00; G01F 1/76; H04L 12/42; H04L 12/40176; H04L 2012/4026
USPC ......... 701/50, 23, 466; 37/197, 234; 700/184, 700/171, 174; 172/4.5, 7
See application file for complete search history.

(56) References Cited

U.S. PATENT DOCUMENTS 5,621,666 A * 4/1997 O'Neall et al. ............... 700/283
5,809,440 A * 9/1998 Beck et al. ...................... 701/50
(Continued)

OTHER PUBLICATIONS

Supplementary European Search Report, EP Application No. 13733907, mailed Jul. 22, 2015 (3 pages).

*Primary Examiner* — Marthe Marc-Coleman
(74) *Attorney, Agent, or Firm* — Kagan Binder, PLLC

(57) ABSTRACT

An agricultural communication system is provided that enables sensor-to-sensor link communications of peripheral farming devices (planters, fertilizer or pesticide applicators, etc.) so as to enhance diagnostics for locating system faults and blockages. The system also provides a means to operate with single-faults present with real-time diagnostics to the operator. The point-to-point communications also facilitates simplified installation by automatically determining the sensor addressing based on the physical connection of the sensors. Since the sensor-to-sensor daisy chain bus system is self-configuring there is no dependency on the sensor manufacturing data or sequential installation procedure to define the sensor address as required in other prior art systems. A dual power supply from each end of the looped bus with independent switching provides operation in the presence of single-faults, and a diagnostic mode combined with sensor power supply voltage measurements provides fault location.

20 Claims, 15 Drawing Sheets

(51) Int. Cl.
*A01B 79/00* (2006.01)
*A01C 7/10* (2006.01)
*H04L 12/40* (2006.01)

(52) U.S. Cl.
CPC .......... *G06F 11/079* (2013.01); *G06F 11/0736* (2013.01); *G06F 11/2007* (2013.01); *G06F 11/2015* (2013.01); *H04L 12/40176* (2013.01); *H04L 12/42* (2013.01); *H04L 2012/4026* (2013.01)

(56) References Cited

U.S. PATENT DOCUMENTS

| | | |
|---|---|---|
| 6,009,354 A | 12/1999 | Flamme et al. |
| 2007/0042803 A1 | 2/2007 | Anderson |
| 2008/0201994 A1 | 8/2008 | Crago |
| 2008/0262669 A1 | 10/2008 | Smid et al. |
| 2009/0276666 A1 | 11/2009 | Haley et al. |

\* cited by examiner

FAULT-TOLERANT SENSING AND MONITORING COMMUNICATIONS BUS SYSTEM FOR AGRICULTURAL APPLICATIONS

CLAIM OF PRIORITY

The present application claims priority to International Application No. PCT/US2013/020464, filed on Jan. 7, 2013, which in turn claims priority to and the benefit of U.S. Provisional Application No. 61/584,000, filed Jan. 6, 2012, the disclosure of which is are hereby incorporated by reference in their entireties.

BACKGROUND OF THE INVENTION

It is often desirable for an equipment operator to know the rate and quantity of articles being dispensed by certain dispensing equipment. For example, farmers who use mechanized equipment to plant agricultural products must know the quantity of seeds that are being dispensed by the mechanized planting equipment in order to optimize crop production and yield in a given area. Often, a farmer must know the quantity of seeds being planted in each row by the mechanized planter in order to optimize production or even if the seed tube planting device is blocked.

To provide rate, quantity, timing, total and blockage information to farmers and other operators of equipment, a variety of sensors and systems have been developed which are capable of detecting that an article has passed along or through a predetermined path and displaying article dispensing performance metrics (i.e. rate, quantity, timing, total and blockage). In the case of mechanized seed planting equipment, most of the detecting sensors utilize electro-optical transducers which receive a light beam transmitted across a seed tube which light beam is interrupted or interfered with by the passage of seeds through the tube. Every time the light beam is interrupted or sufficiently diminished below some predetermined threshold, a "seed event" is said to occur and, for each seed event, the sensors typically send a signal to a central monitor which adds a count to the total count and displays the total count and other information.

In one example agricultural control system disclosed in U.S. Pat. No. 5,864,781 to White, there is described a multi-drop communications that has single point wiring faults that typically cause this type of bus structure to fail or partially fail. This system appears to use a "unique ID code" for each sensor in the system but this feature results in a burden on configuring the monitoring system. The association of this ID with a sensor position is required during the installation or maintenance of the system and hence is not a quick process since each sensor has to be plugged in sequentially and the installer has to wait on the display to recognize the sensor before plugging in the next one.

Nonetheless, with the increase in complexity of the communications system, there is a need to have enhanced diagnostics, fault-tolerant communication bus, and simplified installation.

SUMMARY OF THE INVENTION

In one example embodiment, an agricultural communication system is provided that enables sensor-to-sensor link communications of peripheral farming devices (planters, fertilizer or pesticide applicators, etc.) so as to enhance diagnostics for locating system faults. The system also provides a means to operate with single-faults present with real-time diagnostics to the operator. The point-to-point communications also facilitates simplified installation by automatically determining the sensor addressing based on the physical connection of the sensors. Since the sensor-to-sensor daisy chain bus system is self-configuring there is no dependency on the sensor manufacturing data or sequential installation procedure to define the sensor address as required in other prior art systems. The dual power supply from each end of the looped bus with independent switching provides operation in the presence of single-faults, and a diagnostic mode combined with sensor power supply voltage measurements provides fault location. The various embodiments of a new communications bus system described herein actually reduces the number of wires and connections of the sensors needed in an overall monitoring system.

In a related embodiment, a fault tolerant monitoring and communication system is described herein that includes at least one peripheral electronic control unit (ECU) adapted to control a dispensed product output from a product dispensing unit and at least one master control module adapted to be communicate with the at least one peripheral electronic control unit. The monitoring system also includes a control area network (CAN) communications bus configured to interconnect the at least one peripheral ECU with the at least one master module; and a first plurality of sensor units configured and operatively connected in a daisy chain configuration and then operatively coupled to said at least one master module, each of said sensor units being connected in parallel with each other and to a ground line and to a power source on either end of said daisy chain configuration in the monitoring system, each of said sensor units configured to have dual communication with each other. In a related embodiment, the master control module is adapted to communicate with a second plurality of sensor units as well as with an ISO11783 compliant virtual terminal device.

In this example embodiment of the monitoring and blockage communication unit, the dispensed product unit is selected from the group consisting of a seed planter, a fertilizer unit, an herbicide unit and a pesticide unit. The master control unit is configured to receive a blockage signal from at least one sensor unit operatively coupled to a dispensing product unit.

In yet another embodiment, the fault tolerant communication system described above further includes a slave control module operatively coupled to the CAN bus and configured to communicate with a third plurality of sensor units. In a related example embodiment, the monitoring system further includes a plurality of slave control modules coupled to the CAN bus having operatively coupled thereto a corresponding at least one plurality of sensor units coupled in a daisy chain configuration.

In yet another related embodiment, a master control module is configured to communicate directly with an ISO 11783 compliant virtual terminal (as a user interface) without a seeder or fertilizer electronic control unit (ECU) with a single CAN bus connecting all of the blockage system modules and the virtual terminal together. This configuration also maximizes the total number of individual sensors which can be monitored. In this example embodiment, an air cart with a ground driven seed meter controls the row dispensing unit and there are then only ECUs associated with the blockage monitoring system. In yet another related embodiment, although not shown, the master control module (and associated sensor loop or loops) is configured to communicate directly with virtual terminal to provide for a basic blockage monitoring system.

DESCRIPTION OF THE PREFERRED EMBODIMENTS

Following below are more detailed descriptions of various related concepts related to, and embodiments of, improved systems for monitoring and communicating blockages in seeding, fertilizing, herbicide and pesticide spreading applications. In a related embodiment, the monitoring system is used in salt (or salt) spreading or other material deposition that can get blocked or clogged in a deposition system. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
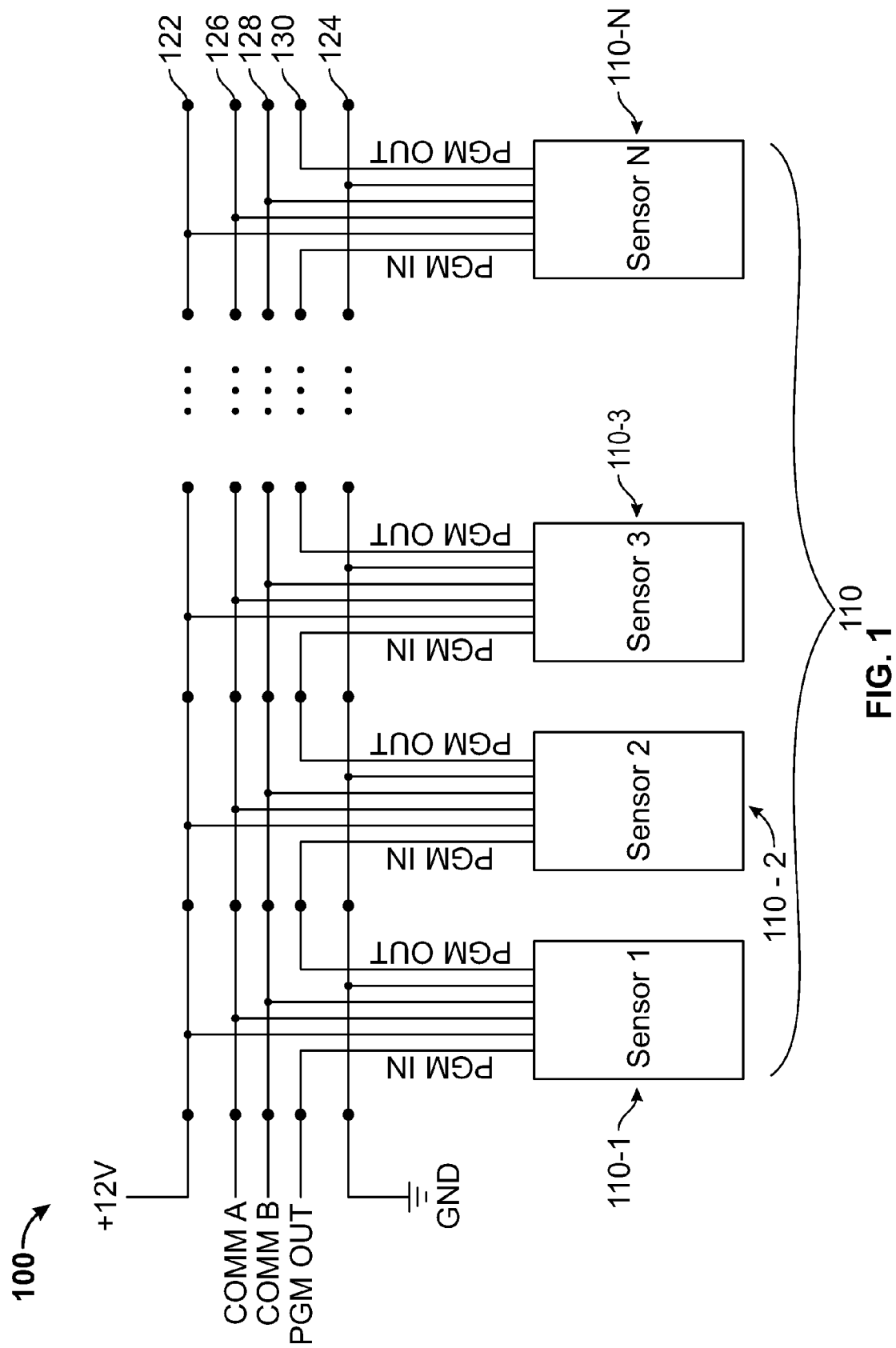
FIG. 1 is a schematic of a prior art monitoring system used in an agricultural application.

Referring now to FIG. 1, there is shown an example of a previous sensor communication subsystem 100 of a monitoring and communication system, similar to a system described in U.S. Pat. No. 5,635,911 issued on Jun. 3, 1997, entitled "Apparatus and Method for Monitoring an Article Dispensing Device such as a Seed Planter and the like", which is herein incorporated by reference in its entirety. System 100 includes an array of sensors 110, coupled to a power bus 122, a ground line 124 and a communications bus or lines 126 and 128 and a program in and out line 130 for creating the daisy chain communication between sensors 110. In this example, power bus 122 is a 12V (volt) line while sensors 110 is comprised of sensors 110-1, 110-2, 110-3 through sensor 110-N. One of the challenges with system 100 is that it does not wrap the end of a communications bus 126 and power bus 122 around back to the originating module. Typical communications and power bus structures use linear bus architectures terminating after the last node. This creates a bus where a single-fault wiring failure results in reduced functionality or complete communications failure.

Figure 2:
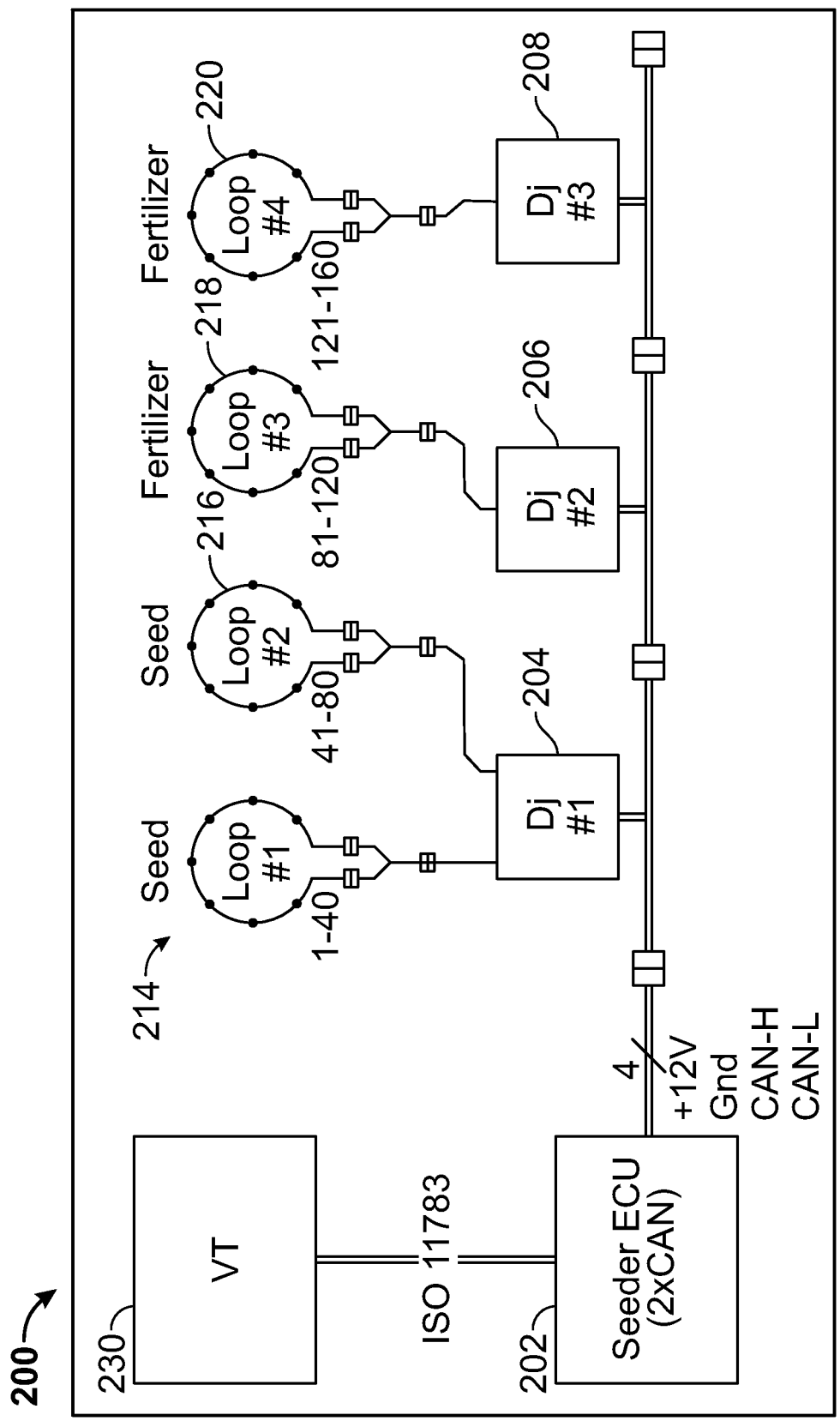
FIG. 2 is a schematic of a monitoring and communication system according to the invention.

In one example embodiment of a novel monitoring and communication system described herein, as shown in FIG. 2, a system 200 is made up of a single or multiple modules, with 1 or 2 sensor loops per module, capable of assigning each loop to one of 2 different blockage groups (seeding or fertilizer in this configuration). This allows the system to independently perform blockage calculations on two different types of applications at the same time.

In this example embodiment, an operate mode interaction of a seeding control unit (S-ECU) and the monitoring system includes the steps of:
1. Transmit configuration (at start up)
2. Start system
3. Receive blockage information from any product deposition unit and Alarms; and
4. Stop system In a related embodiment, the monitoring system describe herein also provides enhanced diagnostic messages to aid in troubleshooting. If at any point the system status changes, the monitoring system will generate an alarm message that indicates the type of problem in the system. In this example embodiment, the S-ECU will then request a status of the system to determine the exact problem. There can only be one active alarm in the monitoring system at a given time, hence upon reception of an alarm the S-ECU will acknowledge the alarm and store/display the alarm to the operator. Once an alarm is acknowledged in the monitoring system, the next highest alarm will be posted if any exists.

A list of alarms is provided in the system hardware and is associated with an Alarm Manager message or signal. This message is sent anytime that an alarm generating unit has detected an alarm condition. Transmission of this message may be periodic or on change of an Alarm Action. The alarm bitfield is a bitfielded 16 bit value that can represent anything to distinguish an alarm that can be generated from multiple sources. A non-zero bitfield will represent an occurrence of the alarm is present (Alarm On), and a 0 value represents no active occurrences of his alarm exist at this time (Alarm Off). Information about the alarm if applicable (optional) will be provided in the Alarm Data. The Alarm Data and Alarm Bitfield are application and alarm number specific. This message is sent from the monitoring system (DCBS) to the S-ECU every one second if there is an Alarm Engaged that has not been acknowledged by the S-ECU. The S-ECU acknowledges the alarm by sending an Alarm Manager Signal Response for that alarm ID. The intent of this message is to provide the S-ECU information of DCBS Alarm status. One CAN Message is defined for every Alarm ID. After an Alarm is disengaged the Alarm Message will be sent once to indicate that the alarm has cleared.

Figure 3:
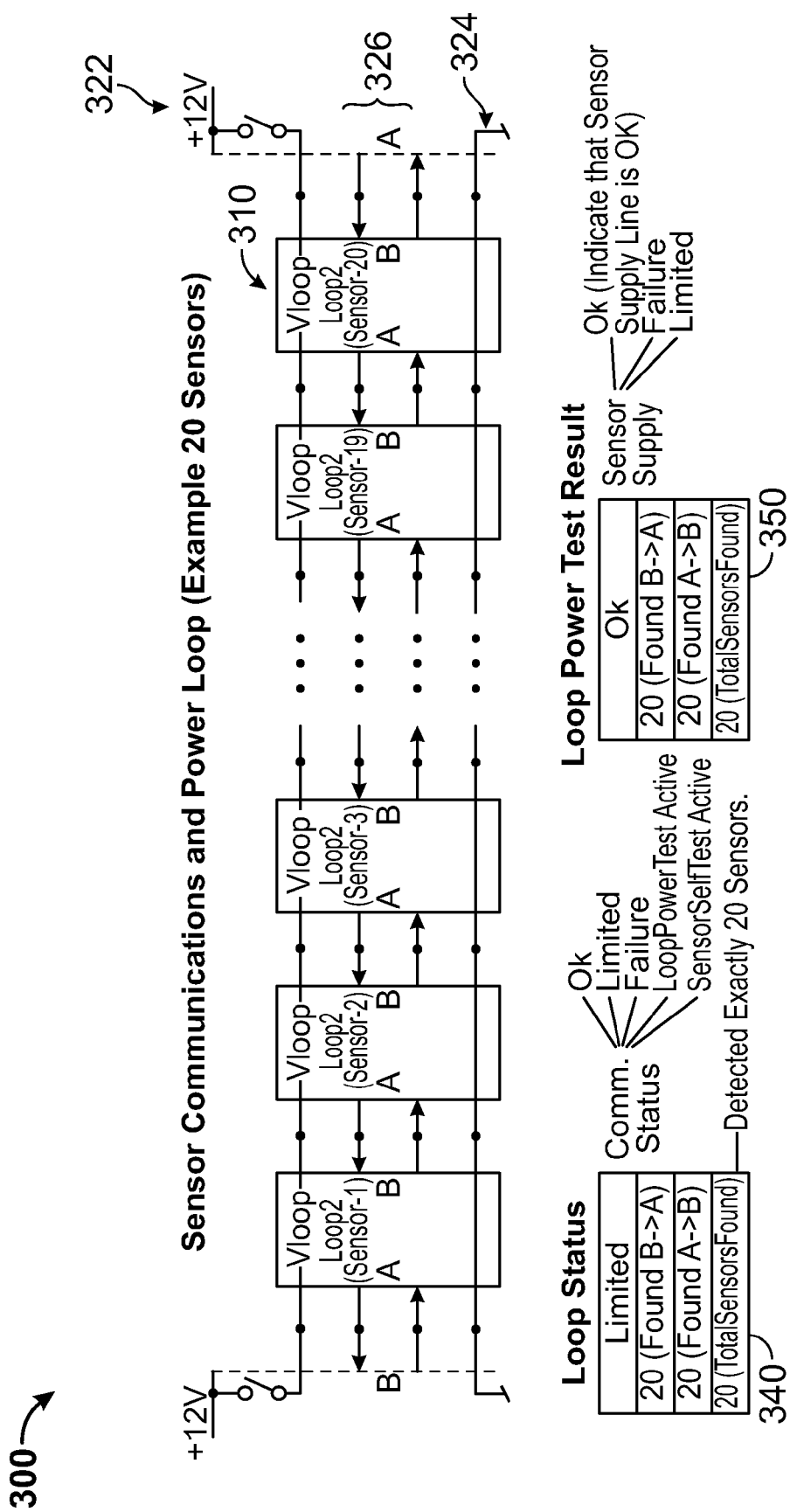
FIG. 3 is a schematic of a subsystem of a monitoring and communication system according to the invention.

The sensor and communication architecture of the various embodiments of the invention allows for full system operation during a single-fault wiring failure. Referring again to FIG. 2, there is shown one example embodiment of a communications interface system 200 disposed between a seeder electronic control unit 202 (S-ECU) and a dispensed product blockage system, a portion of which is shown in FIG. 3 in sensor and communications power loop 300. The dispensed product in this example embodiment is a seed, such as corn or soybean. In a related embodiment, the dispensed product is selected from the group consisting of fertilizer, pesticide, herbicide and any other agricultural product or salt, sand or rock when used in commercial applications.

In this example embodiment, the dispensed product blockage system incorporating system 200 and system 300 is configured to include up to 4 modules and a total of 8 loops (8×54=432 total sensors). Each module can interface a maximum of 2 sensor loops. In this example embodiment, the maximum number of sensors per loop is 54. In this example embodiment, system 300 is configured to monitor two separate channels: Seeding and Fertilizer.

In this example embodiment, sensor numbering is designated by the order of the sensors in the loop (until complete):

Loop 1: Sensor 1—Sensor N (Ex. Seeder position 1 to 40)
Loop 2: Sensor 1—Sensor N (Ex. Seeder position 41 to 80)
Loop 3: Sensor 1—Sensor N (Ex. Seeder position 81 to 120)

S-ECU unit 202 is responsible for mapping the Loop X and Sensor N address to the physical position of a sensor on the Seeding and/or Fertilizer channel. This example embodiment shows a multi-module system that includes modules 204, 206 and 208 having coupled thereto sensor loops 214, 216, 218 and 220, each loop being comprised of a plurality of sensors (about 40 sensors in this example) operatively connected to each other in a daisy chain configuration. In this example embodiment, system 200 has a total of 160 sensors. In module 204, the first module in this example system (Dj#1, Module Position=0) will be the dispensed product system master module. In this example embodiment, S-ECU unit 202 has two CAN communication ports and is capable of communicating with a virtual terminal (VT) 230 via an ISO11783 standard. The dispensed product material system in this example embodiment is located on a second non-ISO CAN Bus.

In a related embodiment, master module 204 is configured to communicate directly with an ISO 11783 compliant virtual terminal 230 (as a user interface) without S-ECS unit 202 with a single CAN bus connecting all of the blockage system modules and virtual terminal 230 together. This configuration also maximizes the total number of individual sensors which can be monitored. In this example embodiment, an air cart with a ground driven seed meter controls the row dispensing unit and there are then only ECUs associated with the blockage monitoring system. In yet another related embodiment, although not shown, master module 204 (and associated sensor loop or loops) is configured to communicate directly with virtual terminal 230 to provide for a basic blockage monitoring system.

Referring now to FIG. 3, there is shown a monitoring and communication system 300 according to one example embodiment which includes an array of sensors 310 coupled to a power bus 322, a ground line 324 and a communications bus 326. In this example embodiment, power bus 322 is a 12V (volt) line, and sensors array 310 is comprised of sensors 310-1, 310-2, 310-3 through sensor 310-N. One of the advantages of system 300 is that it provides for complete end-to-end communications and power bus loop for a fault-tolerant system. Further, full-duplex serial communications in two directions around a communications loop for fault-tolerant data communications is facilitated thereby providing complete system operation when any single fault occurs. In addition, there is a dual power supply source for fault-tolerant power distribution from both sides of the loop. This provides complete system operation when any single power wiring fault occurs.

In various embodiments and variations of system 300, sensor loop diagnostics include module hardware adapted for switching the power supply on and off from each end of the loop. In the instance, where a single-fault data communications or power distribution fault occurs, system 300 provides its location. Where a double-fault data communications or power distribution fault occurs, system 300 provides the location of the open points. With respect to individual sensor diagnostics, sensor power supply voltage monitoring and sensor LED-current for monitoring static optical blockage levels, as well as a discrete Push-Pull physical layer transceiver are optimized for cost and performance in an agricultural environment. Individual sensor-to-sensor link communications and periodic messages are used to continuously determine the communications health of the system. On-demand messages are used to determine integrity of the power bus. This is shown in a Loop Status 340 and a Loop Power Test Result 350 messages from system 300.

In a related embodiment, system 300 is used in a Seed Blockage Sensing System such that the communication bus is used for communicating blockage data when the Seed Blockage Sensing system detects a blockage of an overall seed distribution system. Blockage data is communicated on the bus and then an alarm sounds (or any other warning signal) to advise the user that a portion of an air seeder system or a portion of a row planter system is blocked. In this example embodiment, 3 phototransistors and 3 photodiodes are used in the system to detect blockages such as when the planting tube becomes clogged or blocked or the seed is blown out into the ground. Blockage data is communicated to user via the bus. In another example embodiment, multiple LEDs are used opposite a single photodiode cell to detect blockages.

In another related embodiment, system 300 is used in a Fertilizer Blockage System wherein the bus is applied to a sensor system detecting the blockage of a granular fertilizer distribution system. Blockage data is communicated on the bus, which is eventually communicated to the user in real-time.

In yet another related embodiment, relating to a Seed Counting System, the bus is used in connection with a counting system which is monitoring seed dispensing row units. Seed counting and timing data is communicated on the bus which is delivered to the user in real-time so that adjustments can be made on a timely basis. In this example embodiment, the sensing element is an infrared LED with an associated light sensor to sense disruptions in the light beam. Seed count data and ground speed data are also used to make real-time adjustments in a planting system (or a fertilizer or pesticide system).

Figure 4A:
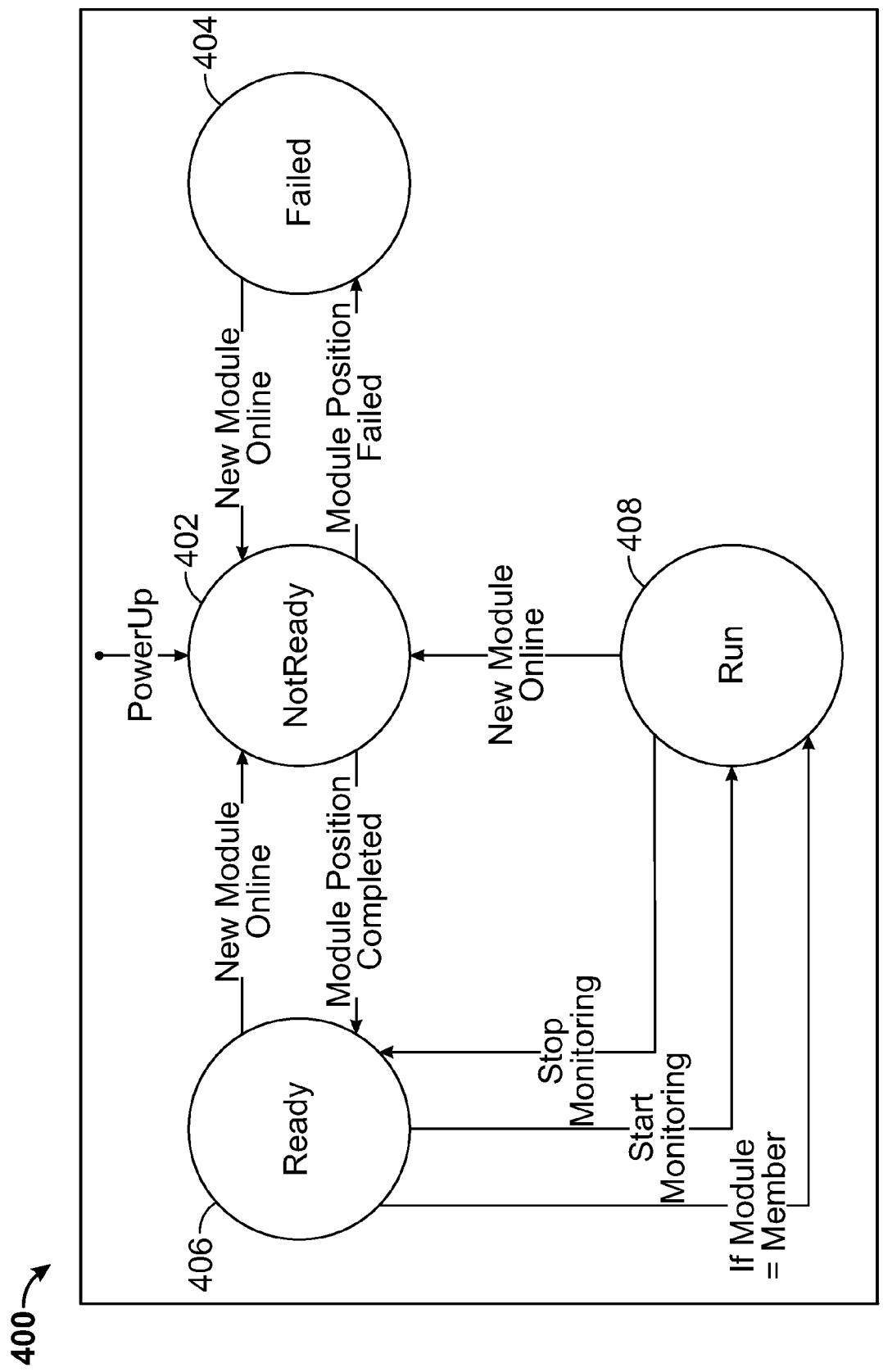
FIGS. 4A-4B is a diagram of a state machine of the monitoring system described herein and a diagram illustrating a plurality of alive messages in the different states and the transition between states of the monitoring system.
Figure 4B:
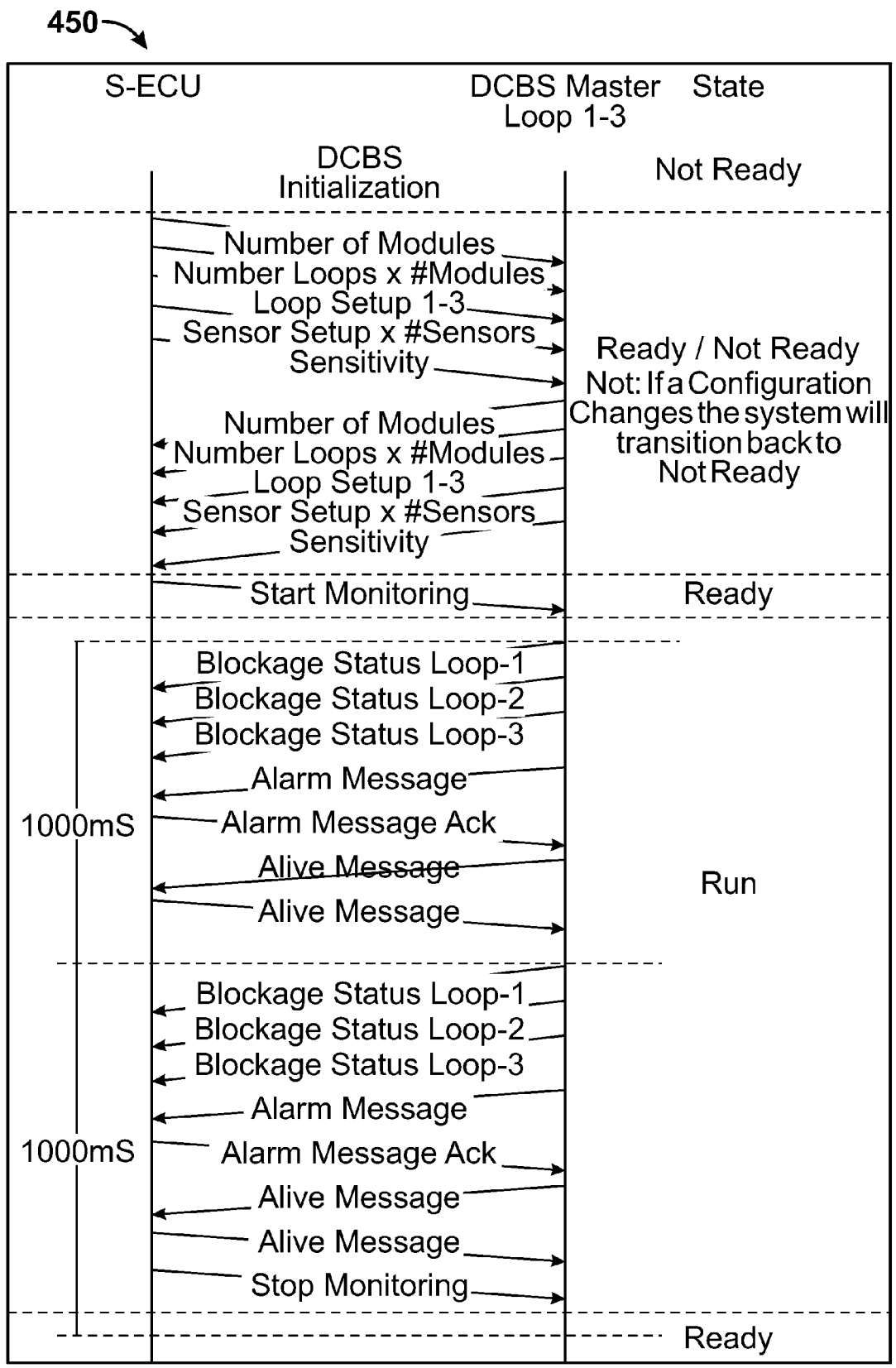

Referring now to FIGS. 4A and 4B, there is shown a diagram of a state machine 400 of monitoring system (DCBS) 200 and a diagram 450 illustrating a plurality of alive messages in the different states and the transition between states of monitoring system 200. In this example embodiment, all control modules (coupled to sensor rings) will wake-up in a NotReady state 402 and all initialization and the module position sequence will start. When the module position sequence has successfully completed, monitoring system 200 will enter a Ready state 406 or a Failed state 404 and system 200 master module (such as master module 204) will indicate this System State. If the Module Position sequence fails the state will change to Failed. Alive messages from master module 204 will indicate the current System State; with this being the only module which the S-ECU will communicate with in this example embodiment. If one or more modules are in Failed state 404, the entire system 200 is in a failed state and a diagnostics screen is optionally presented indicating which of the modules are in the Failed state. Command messages are defined to get the detailed status of any of the modules within the DCBS system. The DCBS system is designed to be able to self-initialize without any communication with the S-ECU. The last set configuration is stored in the DCBS and upon power up will configure and check against that configuration. The S-ECU is responsible for making sure the configuration is set correctly. The S-ECU may query the DCBS for its configuration to determine if changes are needed, or it can send the configuration on each power up. When configuration messages are received the DCBS will determine if the setting is different than previous and re-initialize if necessary. This will transition the state back to NotReady 402 state until initialization has completed.

In the NotReady state, the DCBS will perform all initializations and start up procedures based on its stored configuration. At completion the DCBS will transition into the Ready or Failed state. During initialization, if the hardware configuration does not match the stored configuration, alarms will be generated. In ReadyState 406, the DCBS System is waiting for the System start message, which represents the inactive state of the system. Typically a lift switch is used to transition in and out of this state when the machine transitions from in and out of work. In a RunState 408, the machine indicates that it is in the work state and will begin its blockage monitoring function and report back any blocked rows (which correspond to any blocked dispensing product units). In the FailedState, there is an indication that a failure occurred during the initialization process while the DCBS was in the NotReady state, thereby causing the module to enter a failed state. To transition out of the failed state, the DCBS system failure must be corrected and power cycled or a new module must come online.

Figure 5:
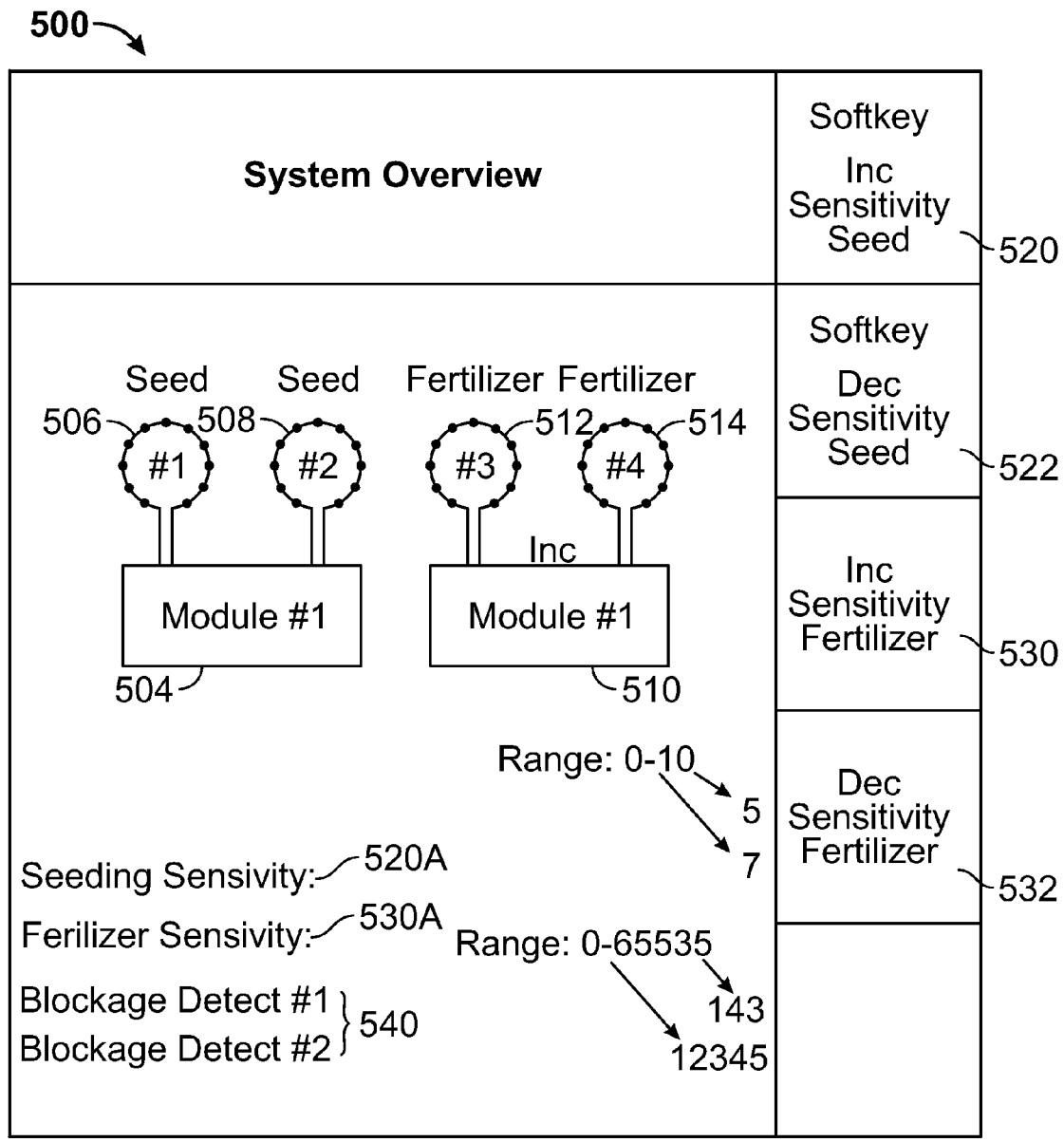
FIG. 5 illustrates a user interface display of a monitoring and communication system according to the invention.

Referring now to FIG. 5, there is illustrated an example embodiment of a user interface display 500 of a monitoring and communication system according to the invention. Display 500 includes images of a Seed module 504, having a set of sensor loops 506 and 508 coupled thereto, and a Fertilizer module 510, having a set of sensor loops 512 and 514 coupled thereto. In another embodiment, modules are configurable to monitor other materials that can be deposited and can clog or block the dispensing units such as pesticides, herbicides, salt, rock, and sand and the like. Display also includes softkeys 520 and 522 for increasing and decreasing seed blockage sensitivity, respectively, as well as softkeys 530 and 532 for increasing and decreasing fertilizer blockage sensitivity, respectively. The results are displayed as Seed Sensitivity 520A and Fertilizer Sensitivity 530A as well as blockage detection for each as 540 along with respective values for each measurement.

Figure 6A:
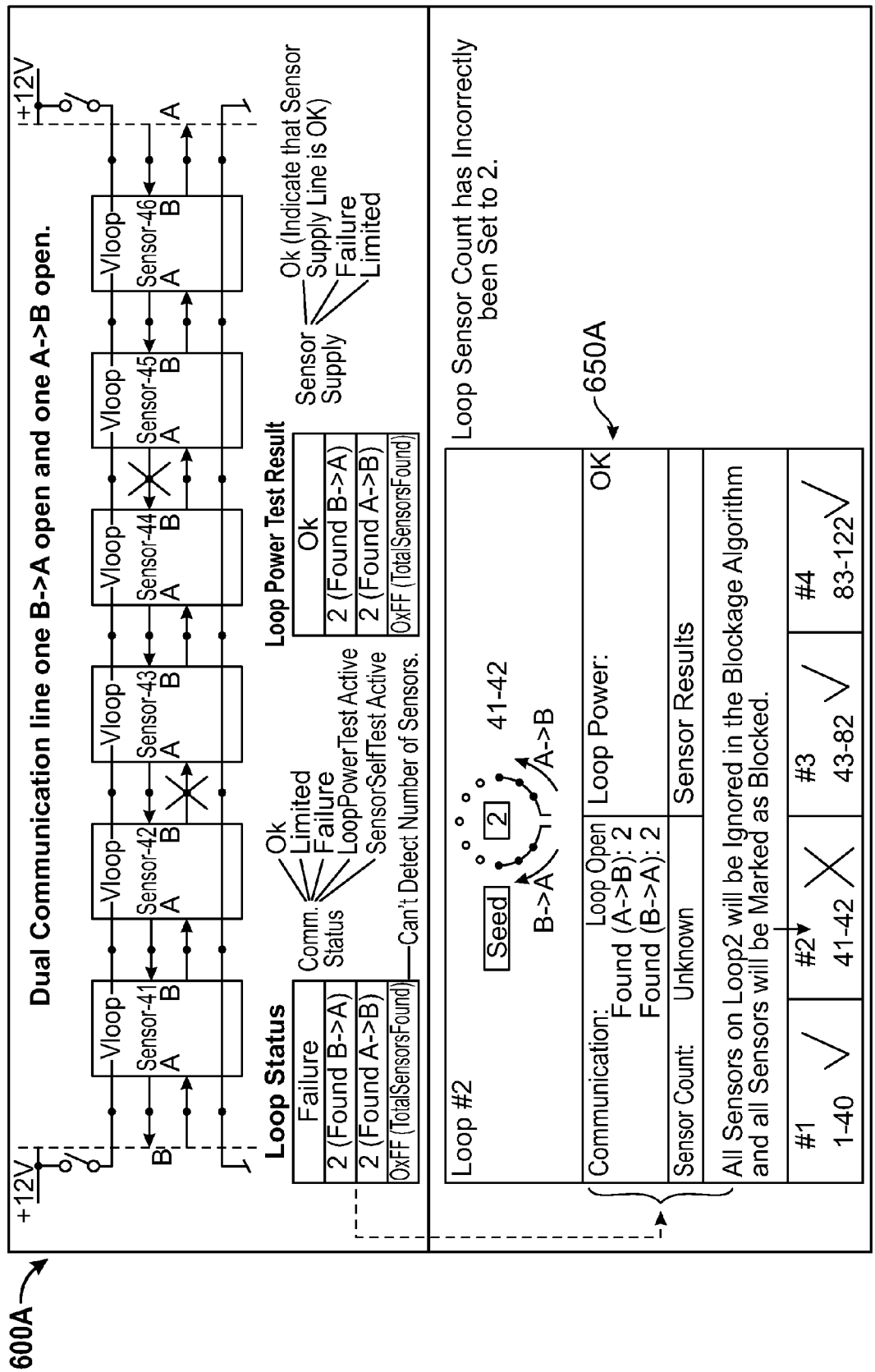
FIGS. 6A-6C is an example of a dual communication failure between two sets of sensors in two directions and various associated user displays of same according to the invention.
Figure 6B:
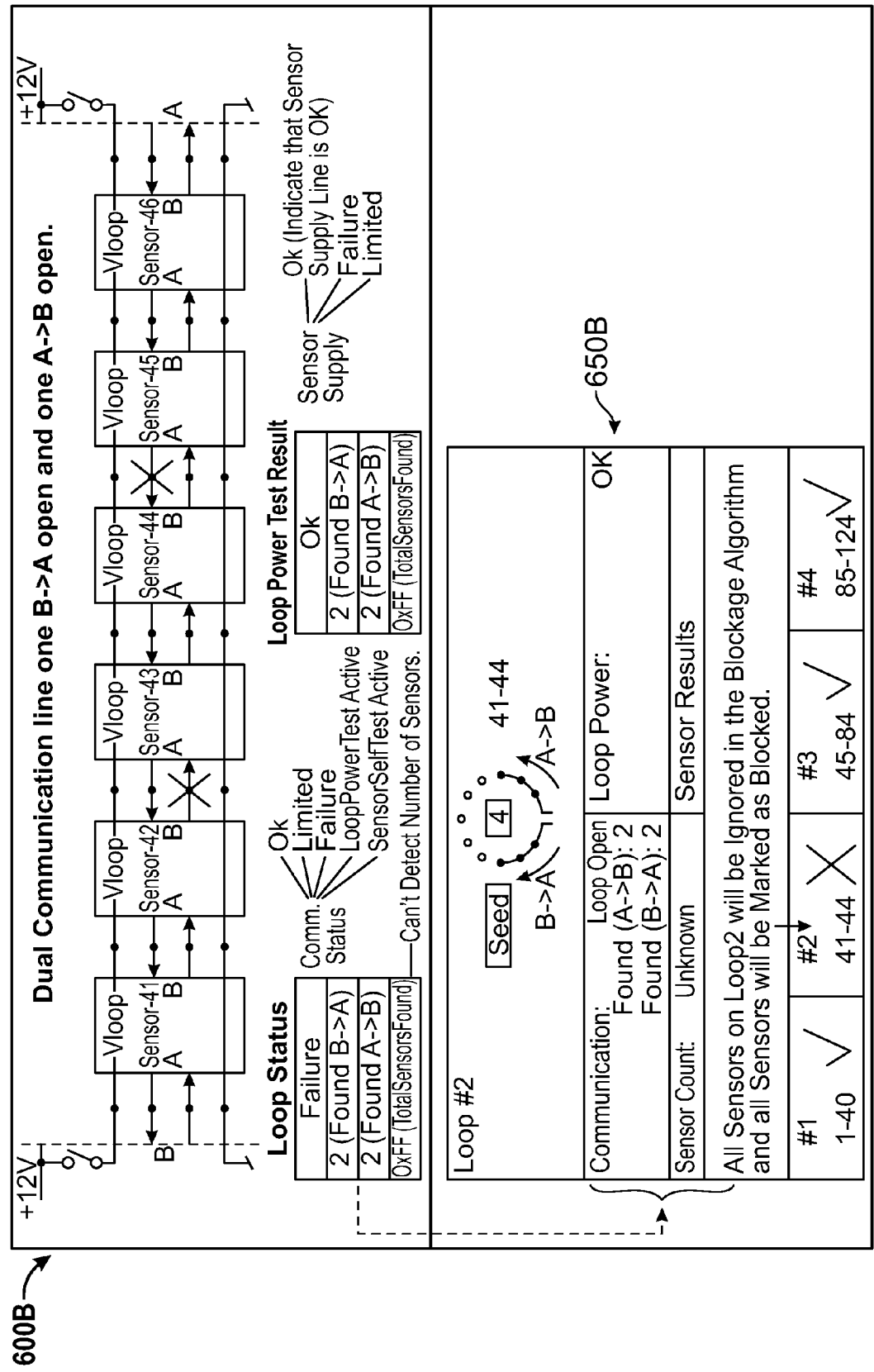
Figure 6C:
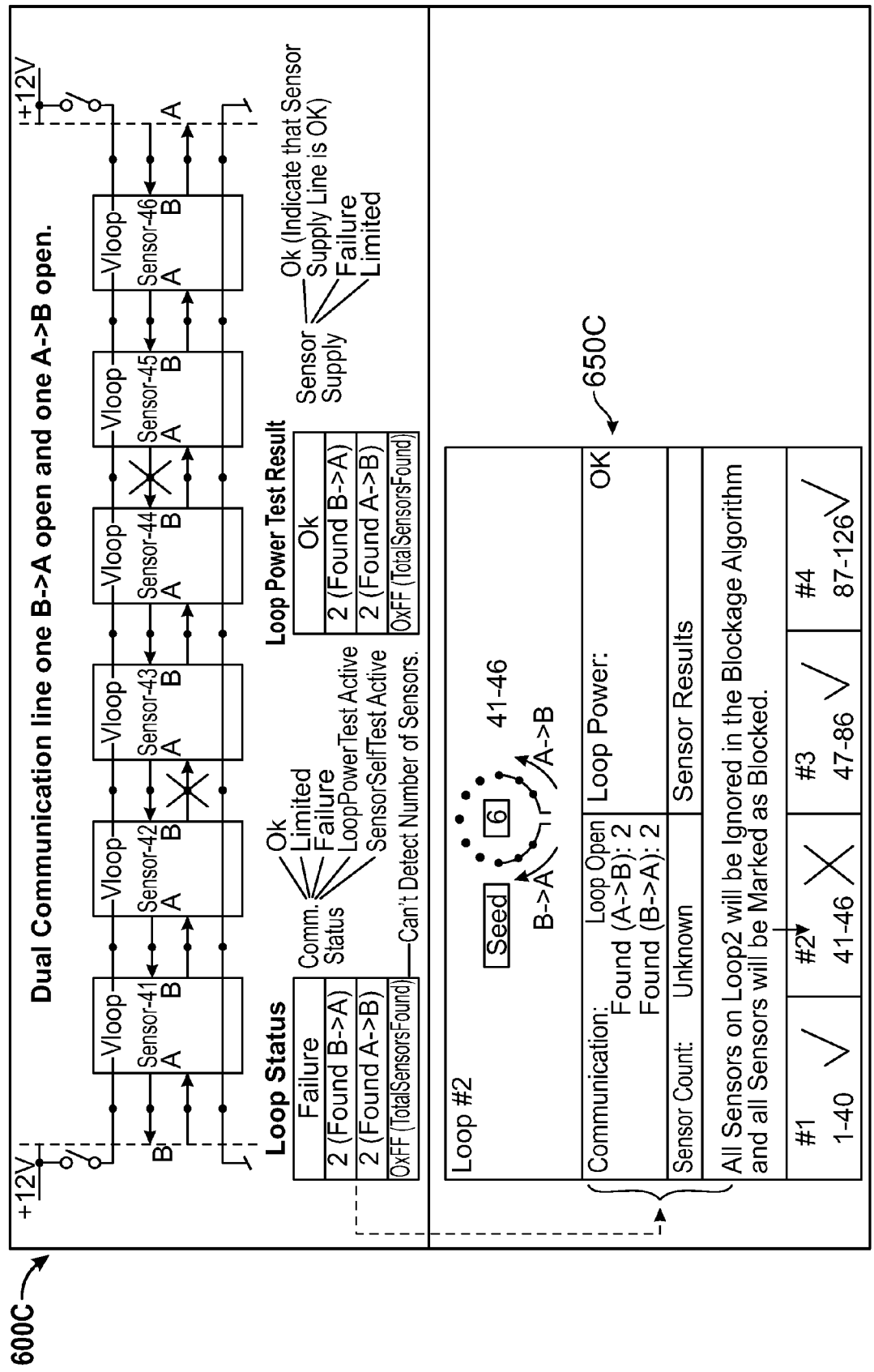
Figure 7A:
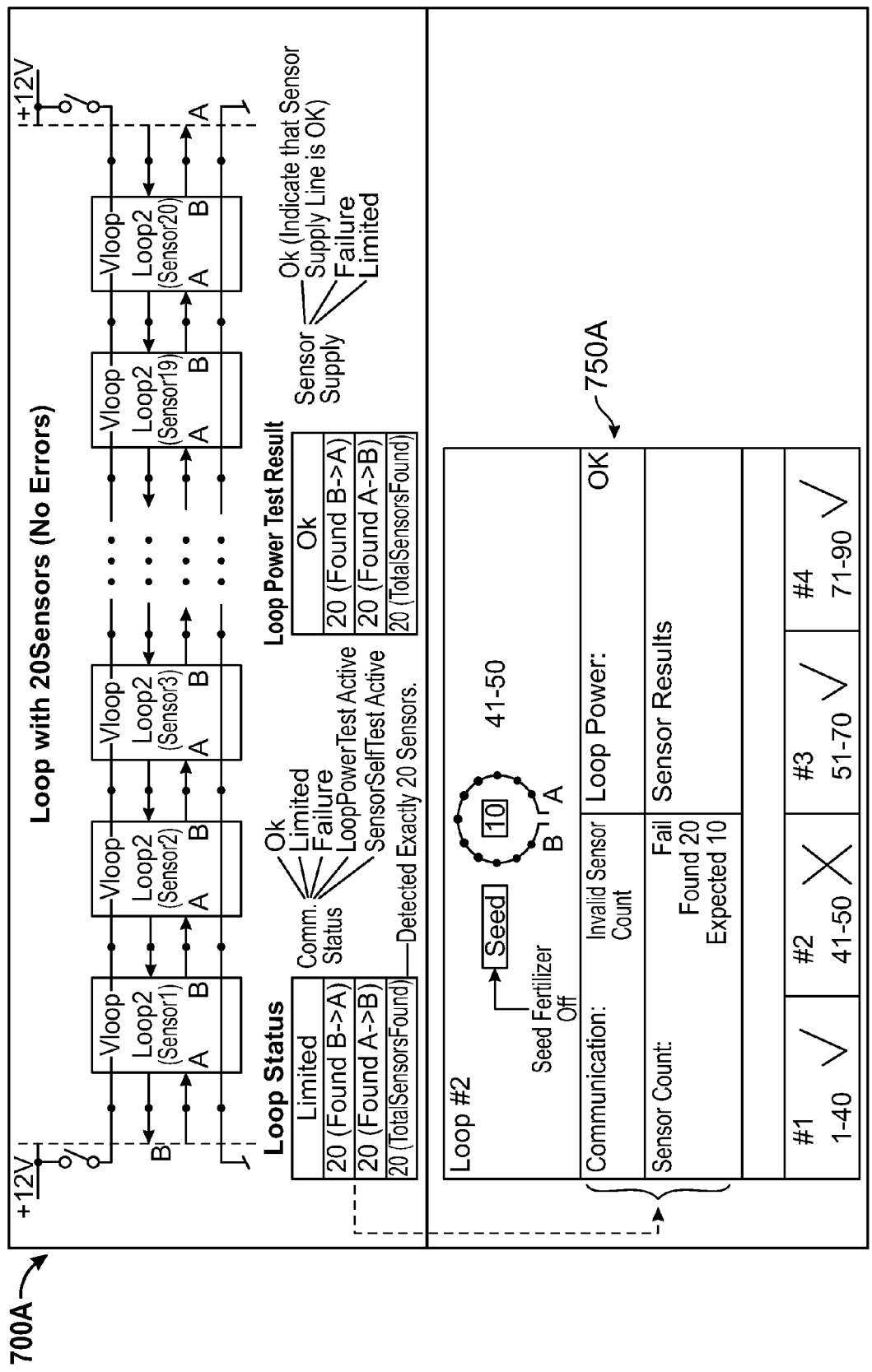
FIGS. 7A-7D is an example of a loop with 20 sensors in various states of dual communication failure between sensors and in one or two directions and various associated user displays of same.
Figure 7B:
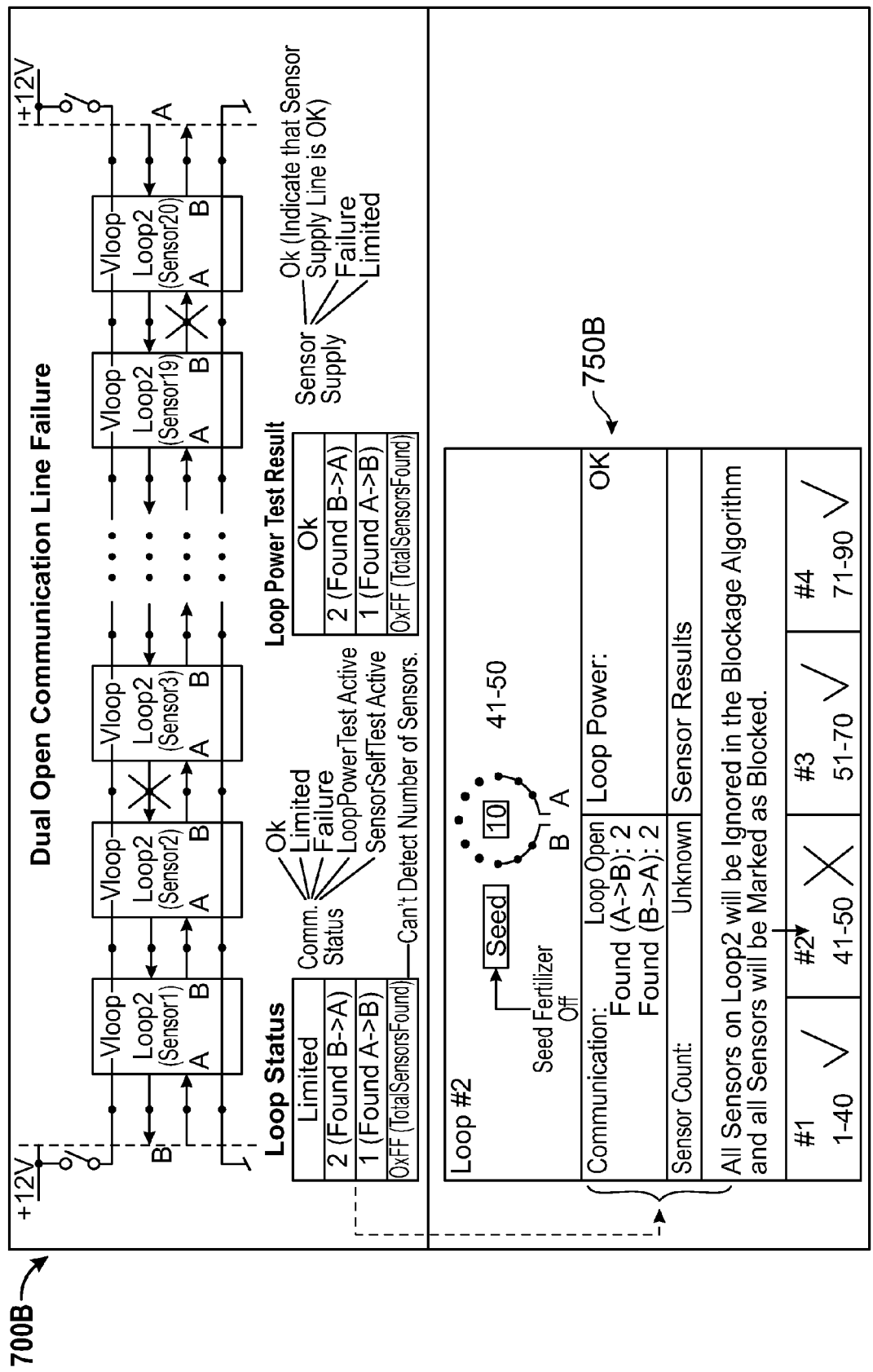
Figure 7C:
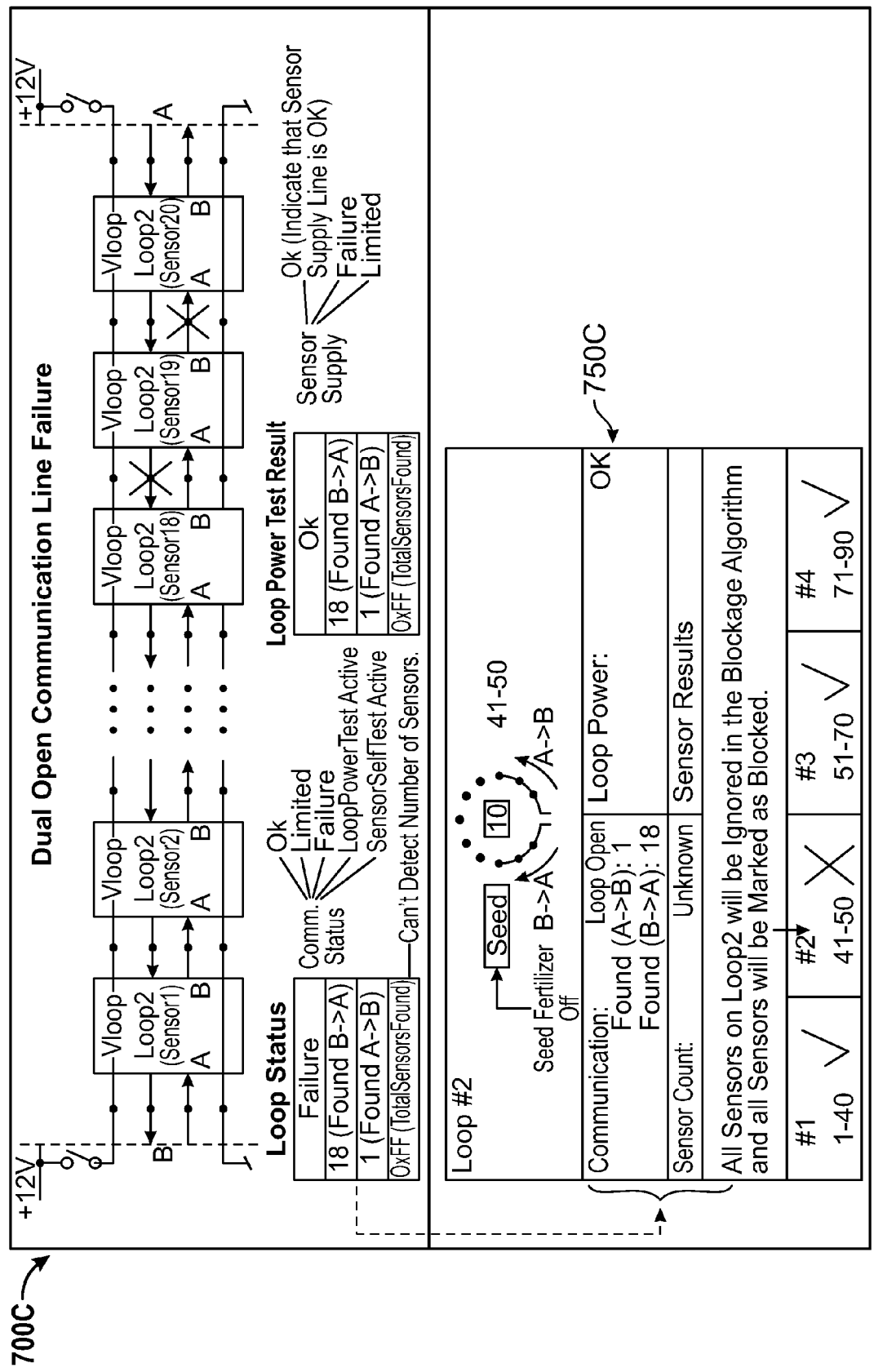
Figure 7D:
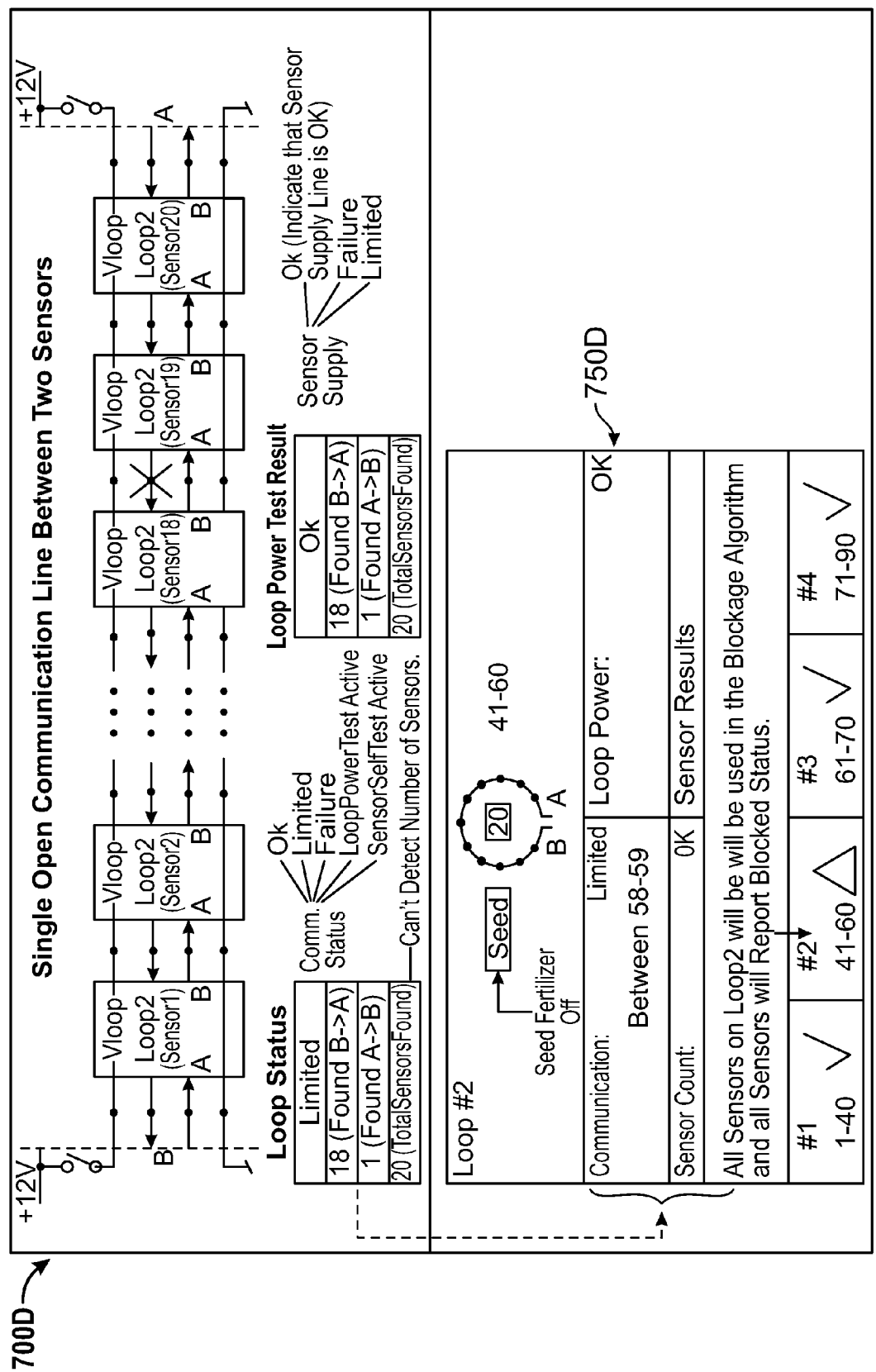

Referring now to FIGS. 6A-6C there is illustrated an example embodiment of a dual communication failure between two sets of sensors in two directions (600A-600C) and various associated user displays (650A-650C) of same according to the invention. In particular, there is a communication line open from B to A (marked by X) between sensor 42 and 43 and a communication line open from A to B (marked by X) between sensor 44 and 45. Note that where the sensor count has been set too low, the only one sensor fault/open is detected of 600A in display 650A. As the sensor count is increased to 4 as in 650B then the correct number of faults are detected. When the sensor count is increased to 6, 650C indicates the correct number of faults detected as well as all of the sensors in the circuit that are affected by the faults/opens.

Referring now to FIGS. 7A-7D is an example of a loop with 20 sensors (700A-700D) in various states of dual communication failure between sensors and in one or two directions and various associated user displays (750A-750D) of same. In particular, note that in 700A and display 750A, the sensor count has been set too low, and only 10 sensors are expected but 20 sensors are found and such is indicated in display 750A as an error message and a fail state. In example sensor circuit 700B, Loop #2 has 20 sensors (Seed in this example as the Fertilizer feature is turned off) there is a communication line open from A to B (marked by X) between sensor 2 and 3 and a communication line open from B to A (marked by X) between sensor 19 and 20. Although the seed sensor count is still unknown and cannot detect the number of sensors, it appears from display 750B that both faults/opens are detected but the correct location is not detected. Since the circuit is not set to detect the correct number of sensors in the loop, all of the sensors (seed or fertilizer or whatever material is dispensed) will be ignored by the blockage algorithm all of the sensors in the loop will be marked as blocked (see display 750B, Loop #2 is marked with an "X"). In example sensor circuit 700C, there is a communication line open from A to B (marked by X) between sensor 18 and 19 and a communication line open from B to A (marked by X) between sensor 19 and 20. Although the seed sensor count is still unknown and cannot detect the number of sensors, it appears from display 750C that both faults/opens are detected but the correct location is not detected. Since the circuit is not set to detect the correct number of sensors in the loop, all of the sensors (seed or fertilizer or whatever material is dispensed) will be ignored by the blockage algorithm all of the sensors in the loop will be marked as blocked (see display 750C, Loop #2 is marked with an "X").

In example sensor circuit 700D, Loop #2 has 20 sensors (Seed in this example as the Fertilizer feature is turned off) with the correct count being reflected in a display 750D so as to be able to detect the correct number of sensors in the loop. In circuit 700D, there is a communication line open from A to B (marked by X) between sensor 18 and 19. It appears from display 750D all of the sensor are detected and that a fault/open is detected and the correct location is also detected. All of the sensors (seed or fertilizer or whatever material is dispensed) will be used in the blockage algorithm and all of the sensors in the loop will report blocked status (see display 750D, Loop #2 is marked with a "Δ"), with the blockage occurring between sensors 58 and 59.

Figure 8A:
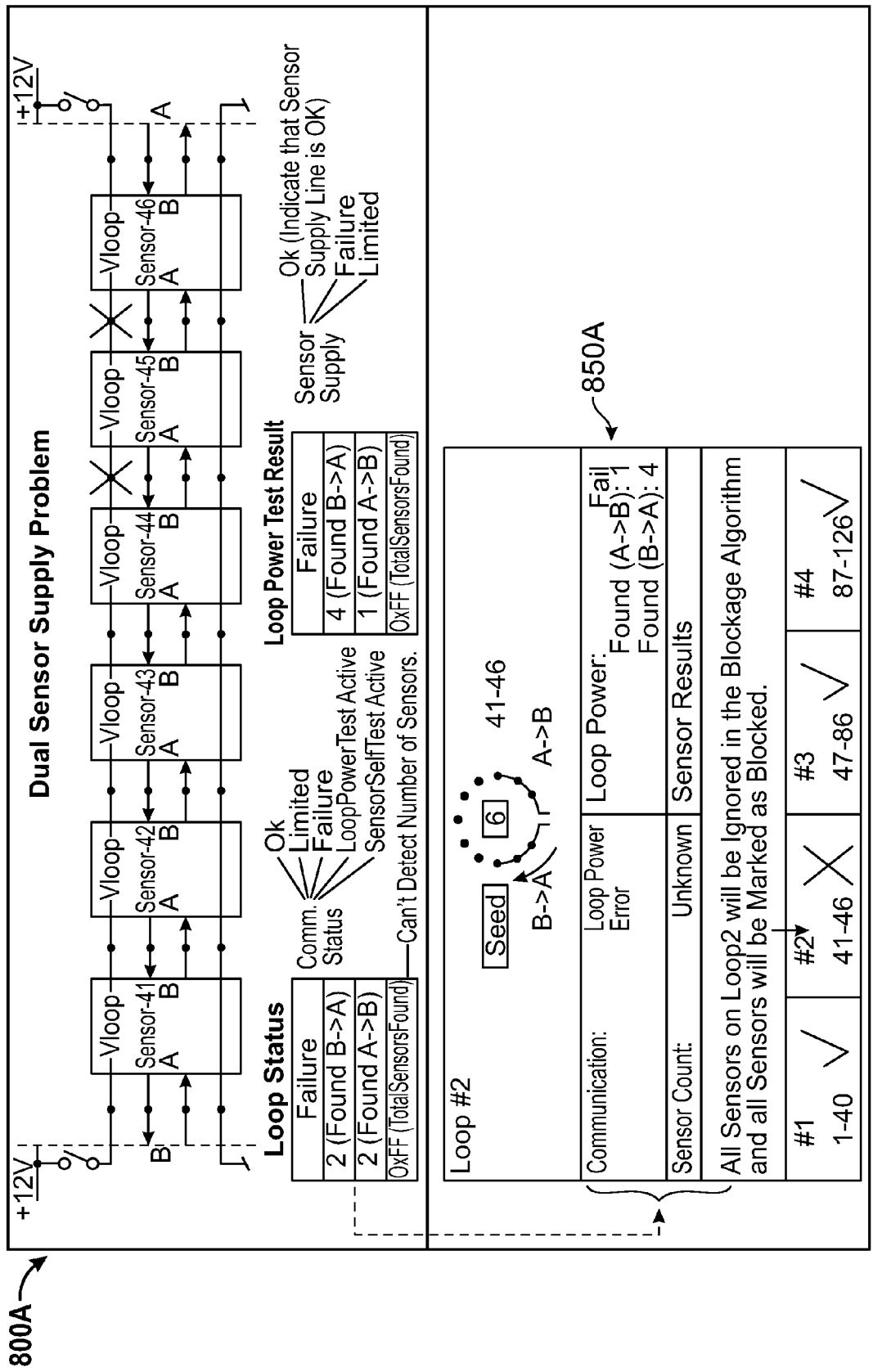
FIGS. 8A-8B is an example of a dual sensor power problem between two sensors and associated user displays of same.
Figure 8B:
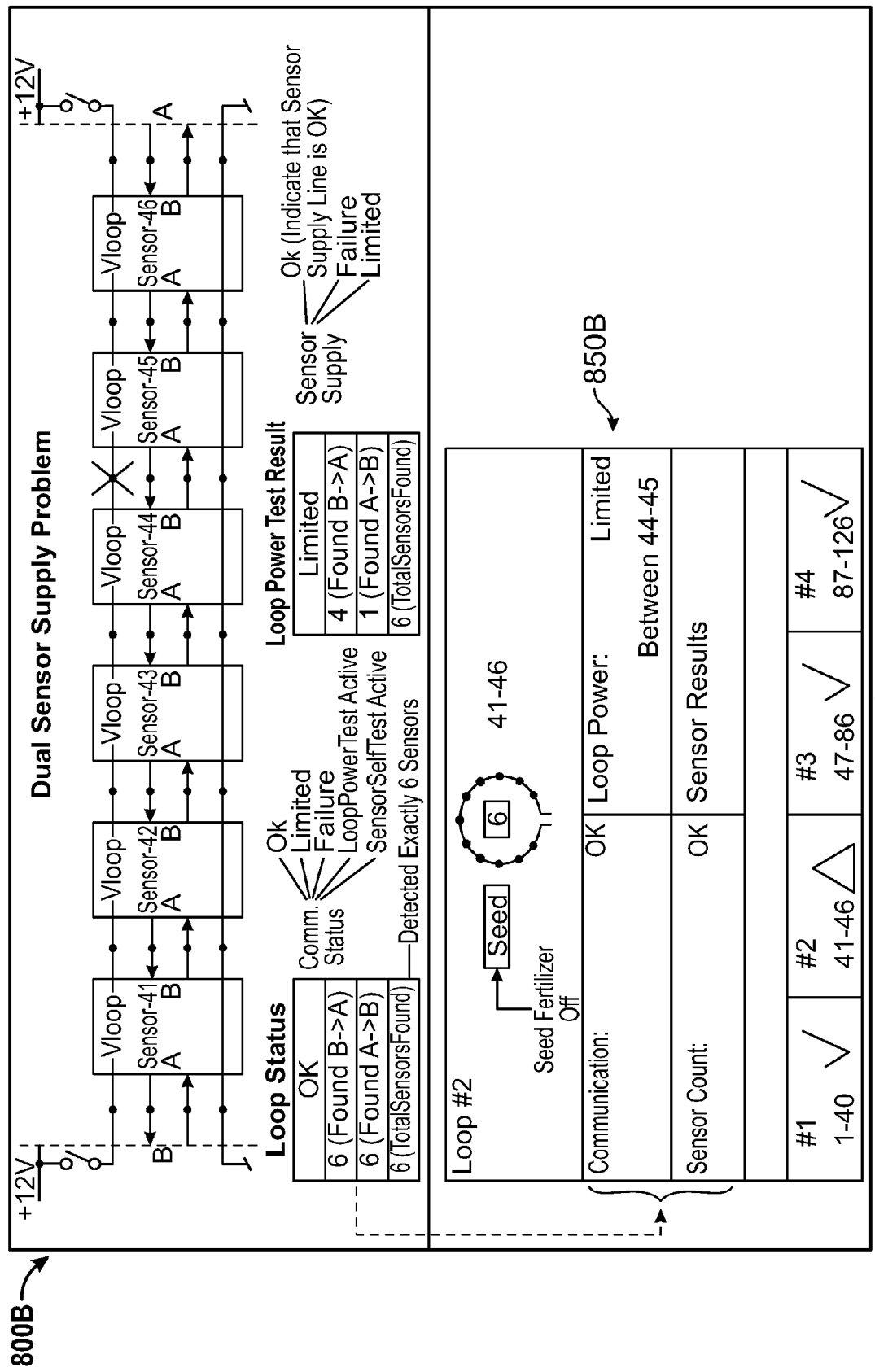

Referring now to FIGS. 8A-8B, there is shown an example embodiment of a dual sensor power problem and communication failure between two sensors and associated user displays of same. In particular, FIG. 8A shows 6 sensors in circuit 800A (sensors 41-46) with the Seed sensor count set to 6 in Loop #2. A power line open (marked by X) is shown between sensors 44 and 45 and another power line open (marked by X) between sensors 45 and 46. All of the sensors (seed or fertilizer or whatever material is dispensed) will be ignored by the blockage algorithm and all of the sensors in the loop will be marked as blocked (see display 850A, Loop #2 is marked with an "X") while the Communication display will show an error and the Loop Power will show where the power line open is to be found.

Referring now to FIG. 8B, in this embodiment 6 sensors are shown in circuit 800B (sensors 41-46) with the Seed sensor count set to 6 in Loop #2 (and the Fertilizer feature turned off) with a power line open (marked by X) being shown between sensors 44 and 45. All of the sensors (seed or fertilizer or whatever material is dispensed) are properly detected and counted (Sensor Count—OK); all of the sensors communicating properly (Communication—OK) and no Sensor Results are displayed. The Loop Power display however detects the power open line between sensors 44 and 45 in display 850B (see display 850B, Loop #2 is marked with a "Δ" between sensors 41-46).

The various embodiments described above include one or more aspects of the following: complete system operation is maintained when any single fault occurs; sensor loop diagnostics provide information that can be presented to the user to aid in fault location; individual sensor diagnostics provides information that can be presented to the user to aid in pending wiring and connector problems and in determining sensor optics blockage level, which is representative of dirt accumulation or damaged optics. In a related embodiment, a microwave sensor is used instead of an optic sensor to sense the product being dispensed (seed, fertilizer, pesticide and the like). In an example embodiment, the cost of the UART transceiver is reduced from commercially available IC parts (CAN, RS-485, etc.) as the threshold voltage levels have more hysteresis than commercially available IC parts. In the case of a single point wiring short, the individual sensor-to-sensor communications link provides a fault-tolerant communications bus while prior art architectures would typically result in stopping all communications on the bus.

In this example embodiment, the system user is presented with information from periodic messages to continuously monitor the communications health of the system. The user invokes on-demand diagnostics to determine integrity of the power bus. The various embodiments of the invention provide diagnostic and configuration messages not found in prior art systems.

In various example embodiments of the blockage monitoring systems described herein, the virtual terminal device is a wireless device coupled to the CAN bus 9 or coupled directly to the master control module. The virtual terminal device can also be selected from the group consisting of a tablet, a smartphone, and a notebook PC.

While the invention has been described in connection with certain preferred embodiments, there is no intent to limit it to those embodiments. On the contrary, it is recognized that various changes and modifications to the exemplary embodiments described herein will be apparent to those skilled in the art, and that such changes and modifications may be made without departing from the spirit and scope of the present invention. Therefore, the intent is to cover all alternatives, modifications and equivalents included within the spirit and scope of the invention as defined by the appended claims.

What is claimed is:

1. A fault tolerant monitoring and communication system comprising:
at least one peripheral electronic control unit (ECU) adapted to monitor product output from a product dispensing unit;
at least one master control module adapted to communicate with the at least one peripheral electronic control unit, wherein the at least one master control module further includes sensor loop diagnostics;
a control area network (CAN) communications bus configured to interconnect the at least one peripheral ECU with the at least one master module; and
a first plurality of sensor units forming a sensor loop configured and operatively connected in a daisy chain loop configuration and then operatively coupled to the at least one master module, each of said sensor units within the loop being connected to a ground line and to a power bus or source on either end of the daisy chain loop in the monitoring system, each of said sensor units further connected at a first end of the sensor loop with a first communication line and connected at a second end of the sensor loop with a second communication line so as to have dual communication with the loop of sensors and individual communication lines between each sensor unit, wherein power to and communication between each of the sensor units is maintained upon occurrence of one of a power loss or a communication line loss on the first or second end of the sensor loop, and wherein the sensor loop diagnostics of the at least one master control module provides a location of a wiring fault, power or communications of a plurality of sensor loops having a fault in the one of the power and communication lines in the at least one sensor loop.

2. The fault tolerant communication system of claim 1, wherein the sensor loop diagnostics of the at least one master control module is configurable to detect one of a sensor fault, an open power line and an open communication line.

3. The fault tolerant communication system of claim 2, wherein the sensor loop diagnostics is adapted to identify among a plurality of sensor loops, the location by sensor and sensor loop of one or more sensor or line faults.

4. The fault tolerant communication system of claim 1, wherein the dispensing product unit is selected from the group consisting of a seed planter, a fertilizer spreader, an herbicide spreader and a pesticide unit.

5. The fault tolerant communication system of claim 1, wherein said master control unit is configured to receive a blockage signal from at least one sensor unit operatively coupled to the dispensing product unit.

6. The fault tolerant communication system of claim 5, further comprising a slave control module operatively coupled to said CAN bus and configured to communicate with a third plurality of sensor units in a third sensor loop.

7. The fault tolerant communication system of claim 1, further comprising a virtual terminal device operatively coupled to the CAN bus and to said peripheral ECU and said master control module.

8. The fault tolerant communication system of claim 7, wherein the virtual terminal device is wirelessly coupled to the CAN bus.

9. The fault tolerant communication system of claim 1, wherein the at least one peripheral electronic control unit is adapted to map each sensor unit and sensor loop by providing each sensor unit an individual sensor address within each loop.

10. A fault tolerant communication and blockage monitoring system comprising:
at least one master control module adapted to communicate with and control a dispensed product output from a product dispensing unit, wherein the at least one master control module further includes sensor loop diagnostics;
a control area network (CAN) communications bus configured to interconnect the at least one peripheral electronic control unit (ECU) with the at least one master module; and
a first plurality of sensor units forming a sensor loop configured and operatively connected in a daisy chain loop configuration and then operatively coupled to the at least one master module, each of the sensor units within the sensor loop being connected to a ground line and to a power bus or source on either end of the daisy chain loop in the monitoring system, each of said sensor units further connected at a first end of the sensor loop with a first communication line and connected at a second end of the sensor loop with a second communication line so as to have dual communication with the loop of sensors and individual communication lines between each sensor unit, wherein power to and communication between each of the sensor units is maintained upon occurrence of one of a power loss or a communication line loss on the first or second end of the sensor loop, and wherein the sensor loop diagnostics of the at least one master control module provides a location of a wiring fault, power or communications of a plurality of sensor loops having a fault in the one of the power and communication lines in the at least one sensor loop.

11. The fault tolerant communication system of claim 10, wherein the sensor loop diagnostics of the at least one master control module is configurable to detect one of a sensor fault, an open power line and an open communication line.

12. The fault tolerant communication system of claim 11, further comprising a slave control module operatively coupled to said CAN bus and configured to communicate with a second plurality of sensor units in a second sensor loop.

13. The fault tolerant communication system of claim 11, further comprising a slave control module operatively coupled to said CAN bus, wherein the master module and the slave module have coupled thereto one or two sensor loops and are adapted to assign each loop to one of 2 different blockage groups, thereby allowing the system to independently perform blockage calculations on two different types of applications at the same time.

14. The fault tolerant communication system of claim 11, further comprising a virtual terminal operatively coupled to the CAN bus and to said master control module.

15. The fault tolerant communication system of claim 11, wherein the sensor loop diagnostics are adapted to identify among a plurality of sensor loops, the location by sensor and sensor loop of one or more sensor or line faults.

16. The fault tolerant communication system of claim 10, wherein the dispensing product unit is selected from the group consisting of a seed planter, a fertilizer spreader, an herbicide spreader and a pesticide unit.

17. A fault tolerant seed sensor or dispensed product monitoring and communication system comprising:
a first plurality of sensor units forming a sensor loop configured and operatively connected in a daisy chain loop configuration and then operatively coupled to at least one master module, each of said sensor units within the sensor loop being connected to a ground line and to a power bus or source on either end of the daisy chain loop in the monitoring system, each of said sensor units further connected at a first end of the sensor loop with a first communication line and connected at a second end of the sensor loop with a second communication line so as to have dual communication with the loop of sensors and individual communication lines between each sensor unit, wherein power to and communication between each of the sensor units is maintained upon occurrence of one of a power loss or a communication line loss on the first or second end of the sensor loop, and wherein the sensor loop diagnostics of the at least one master control module provides a location of a wiring fault, power or communications of a plurality of sensor loops having a fault in the one of the power and communication lines in the at least one sensor loop.

18. The fault tolerant communication system of claim 17, wherein each of the sensor units are adapted for communication in one or two directions and are adapted for communication between sensors.

19. The fault tolerant communication system of claim 17, further comprising a control area network (CAN) communications bus configured to interconnect the at least one master control module with a slave control module, said slave module configured to communicate with a second plurality of sensor units in a second sensor loop, wherein the master module and the slave module have coupled thereto one or two sensor loops and are adapted to assign each loop to one of 2 different blockage groups, thereby allowing the system to independently perform blockage calculations on two different types of applications at the same time.

20. The fault tolerant communication system of claim 19, further comprising at least one peripheral electronic control unit (ECU) adapted to monitor a dispensed product output from a product dispensing unit and said ECU being operatively coupled to said CAN bus, wherein the at least one peripheral electronic control unit is adapted to map each sensor unit and sensor loop by providing each sensor unit an individual sensor address location within a loop.

* * * * *